United States Patent [19]
Motai et al.

[11] Patent Number: 5,660,799
[45] Date of Patent: Aug. 26, 1997

[54] EXHAUST GAS BOILER

[75] Inventors: Toshiki Motai; Norihisa Kobayashi, both of Tokyo, Japan

[73] Assignee: Mitsubishi Jukogyo Kabushiki Kaisha, Tokyo, Japan

[21] Appl. No.: 432,210

[22] PCT Filed: Sep. 16, 1994

[86] PCT No.: PCT/JP94/01527

§ 371 Date: May 11, 1995

§ 102(e) Date: May 11, 1995

[87] PCT Pub. No.: WO95/07751

PCT Pub. Date: Mar. 23, 1995

[30] Foreign Application Priority Data

Sep. 17, 1993 [JP] Japan ............ 5-231413

[51] Int. Cl.$^6$ ............ F01N 5/02; G05D 16/00; B01D 53/56; F23J 15/00
[52] U.S. Cl. ............ 422/112; 422/168; 422/177; 122/7 R; 122/470; 60/39.5; 60/39.182
[58] Field of Search ............ 422/168, 177, 422/107, 112; 122/470, 7 R; 60/39.5, 39.182

[56] References Cited

U.S. PATENT DOCUMENTS

| | | | |
|---|---|---|---|
| 4,664,067 | 5/1987 | Haneda et al. | 122/7 R |
| 4,891,937 | 1/1990 | Noguchi et al. | 60/39.182 |
| 4,944,252 | 7/1990 | Motai et al. | 122/470 |
| 5,282,355 | 2/1994 | Yamaguchi | 60/39.5 |
| 5,336,081 | 8/1994 | Saito et al. | 431/4 |
| 5,449,495 | 9/1995 | Goto | 422/111 |

FOREIGN PATENT DOCUMENTS

| | | |
|---|---|---|
| 0375616A1 | 12/1989 | European Pat. Off. . |
| 54-4698 | 3/1979 | Japan . |
| 2-152523A | 6/1990 | Japan . |
| 2082085 | 3/1982 | United Kingdom . |

OTHER PUBLICATIONS

Development of NOx Removal Processes with Catalyst for Stationary Combustion Facilities; Mitsubishi Technical Bulletin No. 124; May 1977.

*Primary Examiner*—Nina Bhat
*Attorney, Agent, or Firm*—Fish & Richardson P.C.

[57] ABSTRACT

To achieve a high degree of heat recovery by decomposing surplus ammonia present on the downstream side of a denitrator in an exhaust gas boiler while preventing the deposition of acid ammonia sulfate on low temperature heating tubes, an exhaust gas boiler includes a residual ammonia decomposer which is disposed at a location downstream of the denitrator and between two divided high pressure evaporators.

4 Claims, 7 Drawing Sheets

EXHAUST GAS BOILER

TECHNICAL FIELD

This invention relates to exhaust gas boilers having a denitrator incorporated therein which are characterized in that, even if sulfur oxides are contained in the combustion gas, high degree of heat recovery can be achieved by decomposing the surplus ammonia present on the downstream side of the denitrator almost completely and thus preventing the occurrence of trouble due to the deposition of acid ammonium sulfate on the low-temperature heating tubes.

BACKGROUND ART

Figure 4:
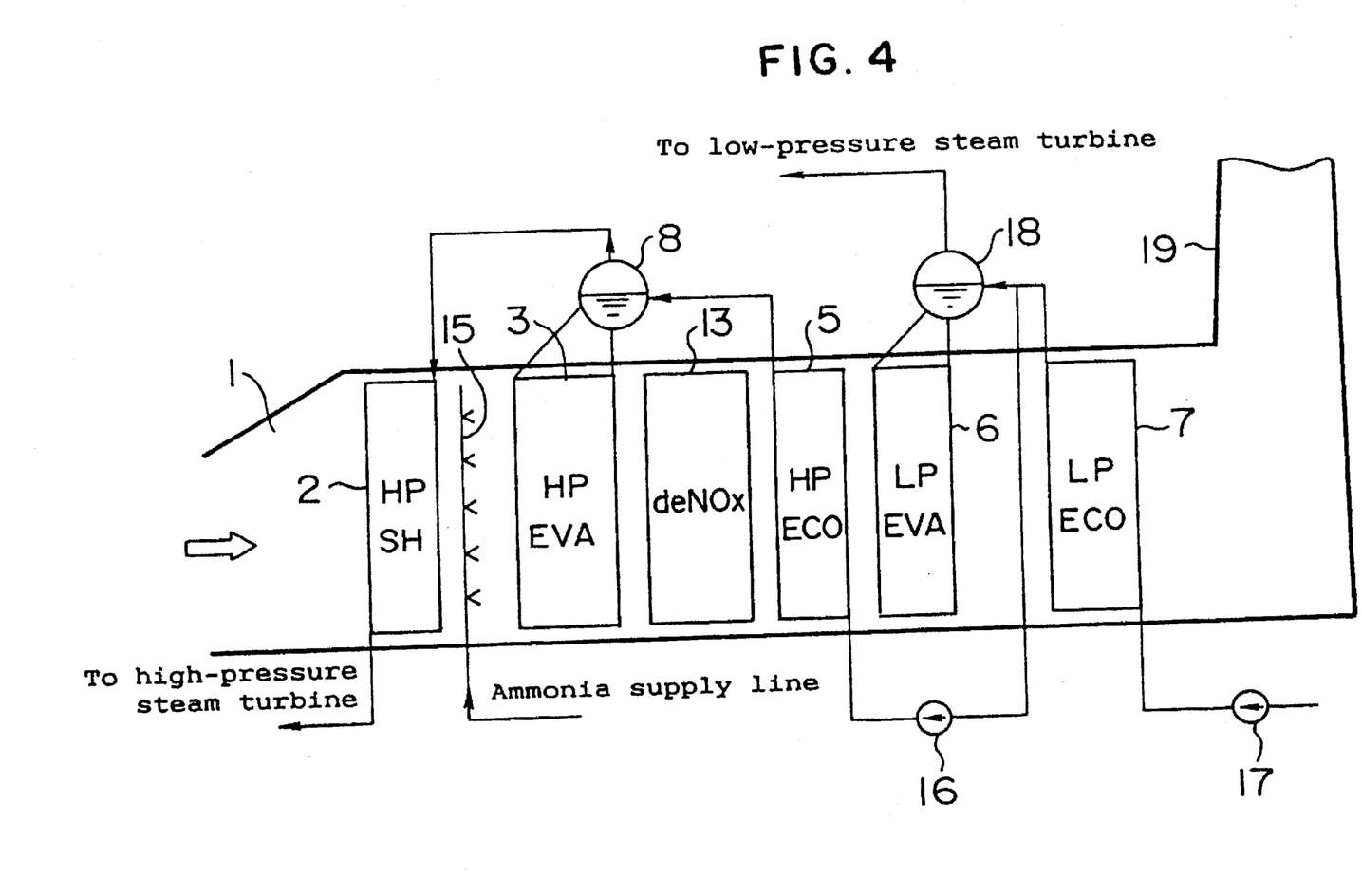
FIG. 4 is a heat transfer surface arrangement diagram illustrating one example of a conventional exhaust gas boiler.
Figure 5:
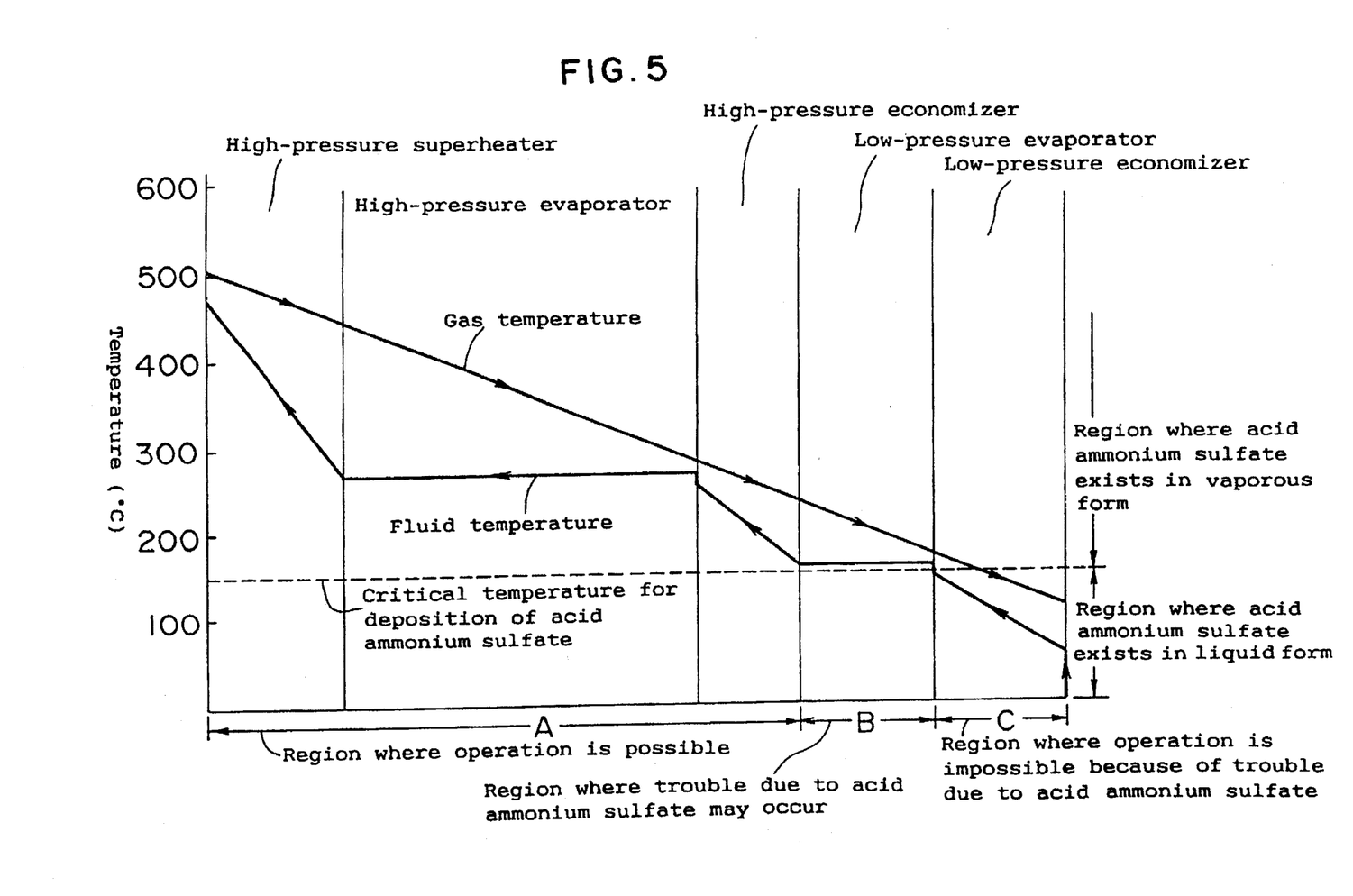
FIG. 5 is a graph showing the distribution of gas temperatures and fluid temperatures in the conventional exhaust gas boiler illustrated in FIG. 4.

FIG. 4 is a heat transfer surface arrangement diagram illustrating one example of a conventional exhaust gas boiler. In this figure, reference numeral 1 represents an exhaust gas flow path; 2, a high-pressure superheater; 3, a high-pressure evaporator; 5, a high-pressure economizer; 6, a low-pressure evaporator; 7, a low-pressure economizer; 8, a high-pressure steam drum; 13, a denitrator; 15, an ammonia injection nozzle; 16, a high-pressure feed water pump; 17, a low-pressure feed water pump; 18, a low-pressure steam drum; and 19, a stack. The fluid temperatures inside the various heat transfer surfaces of this exhaust gas boiler and the gas temperatures outside them are distributed as shown by solid lines in FIG. 5.

Figure 6:
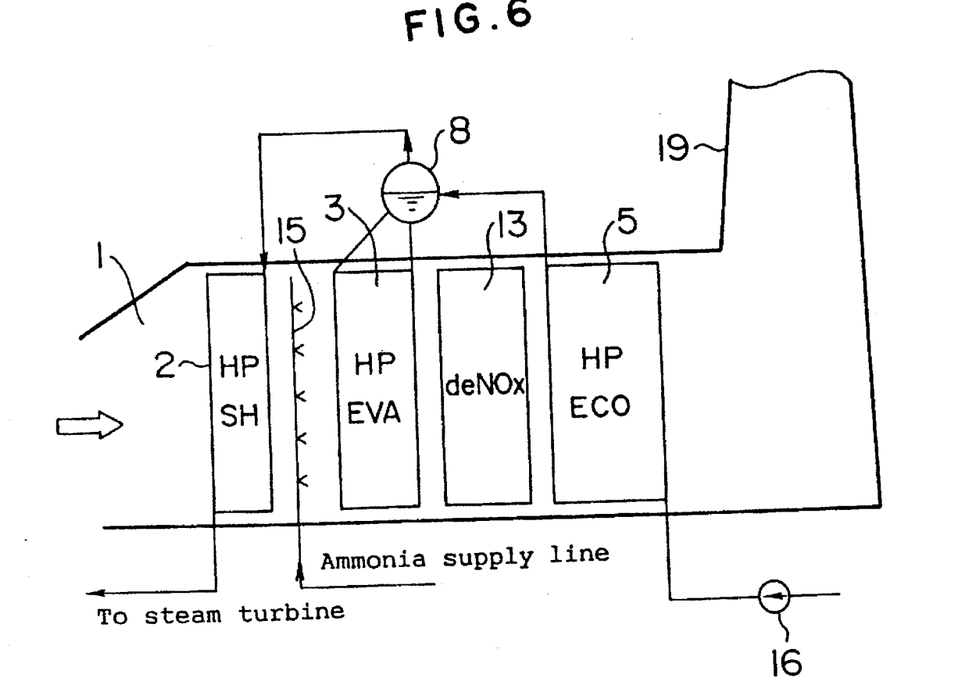
FIG. 6 is a heat transfer surface arrangement diagram illustrating another example of a conventional exhaust gas boiler.

In the above-described conventional exhaust gas boiler, if sulfur oxides are contained in the combustion gas, acid ammonium sulfate may be deposited on the low-temperature heating tubes disposed in a gas temperature region located downstream of the denitrator 13 and having temperatures of 200° C. or below. If so, the increase in gas-side draft loss caused by corrosion of the tubes or clogging of the tubes (especially of the finned tubes) presents a problem. For this reason, heat transfer surfaces cannot be disposed in low-temperature regions (i.e., regions B and C in FIG. 5). Consequently, the heat transfer surface arrangement of FIG. 4 which permits highly efficient heat recovery cannot be employed, and a simpler heat transfer surface arrangement as illustrated in FIG. 6 must be employed. Thus, the outlet gas temperature can only be reduced to a level of as high as 200° C.

Even where a clean gas such as LNG is burned, the surplus ammonia level at the outlet of the denitrator usually needs to be reduced to 10 ppm or less. For this reason, it has been difficult to enhance the efficiency of the denitrator.

As a countermeasure to the above-described deposition of acid ammonium sulfate, there is known a method for suppressing the growth of acid ammonium sulfate in which part of the high-temperature gas on the upstream side of the denitrator is suitably supplied to the heat transfer surfaces located downstream of the denitrator and subject to the deposition of acid ammonium sulfate so as to raise the gas temperature around the heating tubes. However, this method is impractical because a complicated arrangement of high-temperature ducts is required and such a high effect as enables the removal of already deposited acid ammonium sulfate cannot be expected. Moreover, if the high-temperature gas is always made to flow, heat absorption in the upstream high-temperature section is decreased and heat absorption in the entire exhaust gas boiler is also decreased. Thus, this method cannot be regarded as suitable even from the viewpoint of plant efficiency.

Furthermore, in the case of clean gases, there has been proposed a method for removing the surplus ammonia by adsorption at the outlet of the denitrator. However, this method has the disadvantage, for example, of increasing the size of the equipment.

DISCLOSURE OF THE INVENTION

In order to solve the above-described problems of the prior art, the present invention provides exhaust gas boilers as described below.

First, there is provided an exhaust gas boiler having a denitrator incorporated therein, characterized in that a residual ammonia decomposer is disposed at a location downstream of said denitrator and between two divided high-pressure evaporators.

Secondly, there is provided an exhaust gas boiler having a denitrator incorporated therein, characterized in that a residual ammonia decomposer is disposed at a location downstream of said denitrator and between two evaporators having different steam pressure levels.

Thirdly, there is provided an exhaust gas boiler constructed by equipping the above-described first or second exhaust gas boiler with means for controlling the internal pressure of the evaporator disposed on the upstream side of said residual ammonia decomposer.

In the above-described first means of solving the problems, the surplus ammonia not consumed in the denitrator is decomposed and decreased by the residual ammonia decomposer disposed on the downstream side thereof. Thus, even if sulfur oxides are contained in the exhaust gas, there is no possibility that acid ammonium sulfate will be deposited on the heating tubes of the low-temperature gas section. Consequently, the exhaust gas boiler can effect heat recovery even in the low-temperature region of the exhaust gas, contributing to an improvement in plant efficiency.

The aforesaid residual ammonia decomposer is disposed between two divided high-pressure evaporators and hence operated in a temperature region which can provide a high degree of ammonia decomposition. Moreover, since any surplus ammonia is decomposed as described above, an ample amount of ammonia may safely be supplied to the upstream side of the denitrator and, therefore, a high degree of denitration can be achieved.

In the above-described second means of solving the problems, the divided evaporators have different steam pressure levels. Consequently, in addition to the above-described action, the inlet gas temperature of the residual ammonia decomposer can be altered by controlling the pressure levels of the evaporators.

In the above-described third means of solving the problems, the exhaust gas boiler is equipped with means for controlling the internal pressure of the evaporator disposed on the upstream side of the residual ammonia decomposer. Thus, the residual ammonia decomposer can be maintained at an optimum temperature by controlling the pressure of that evaporator.

In the exhaust gas boilers having a denitrator incorporated therein which are constructed in accordance with the present invention, even if sulfur oxides are present in the combustion gas, there is no possibility that acid ammonium sulfate will be deposited on the heating tubes of the low-temperature gas section. This makes it possible to employ a heat transfer surface arrangement similar to that employed in conventional high-efficiency exhaust gas boilers. Consequently, the gas temperature at the outlet of the exhaust gas boiler can be reduced, which contributes greatly to an improvement in plant efficiency.

Moreover, an ample amount of ammonia can be supplied without increasing the surplus ammonia, thus resulting in an improvement in the efficiency of the denitrator.

BEST MODE FOR CARRYING OUT THE INVENTION

Figure 1:
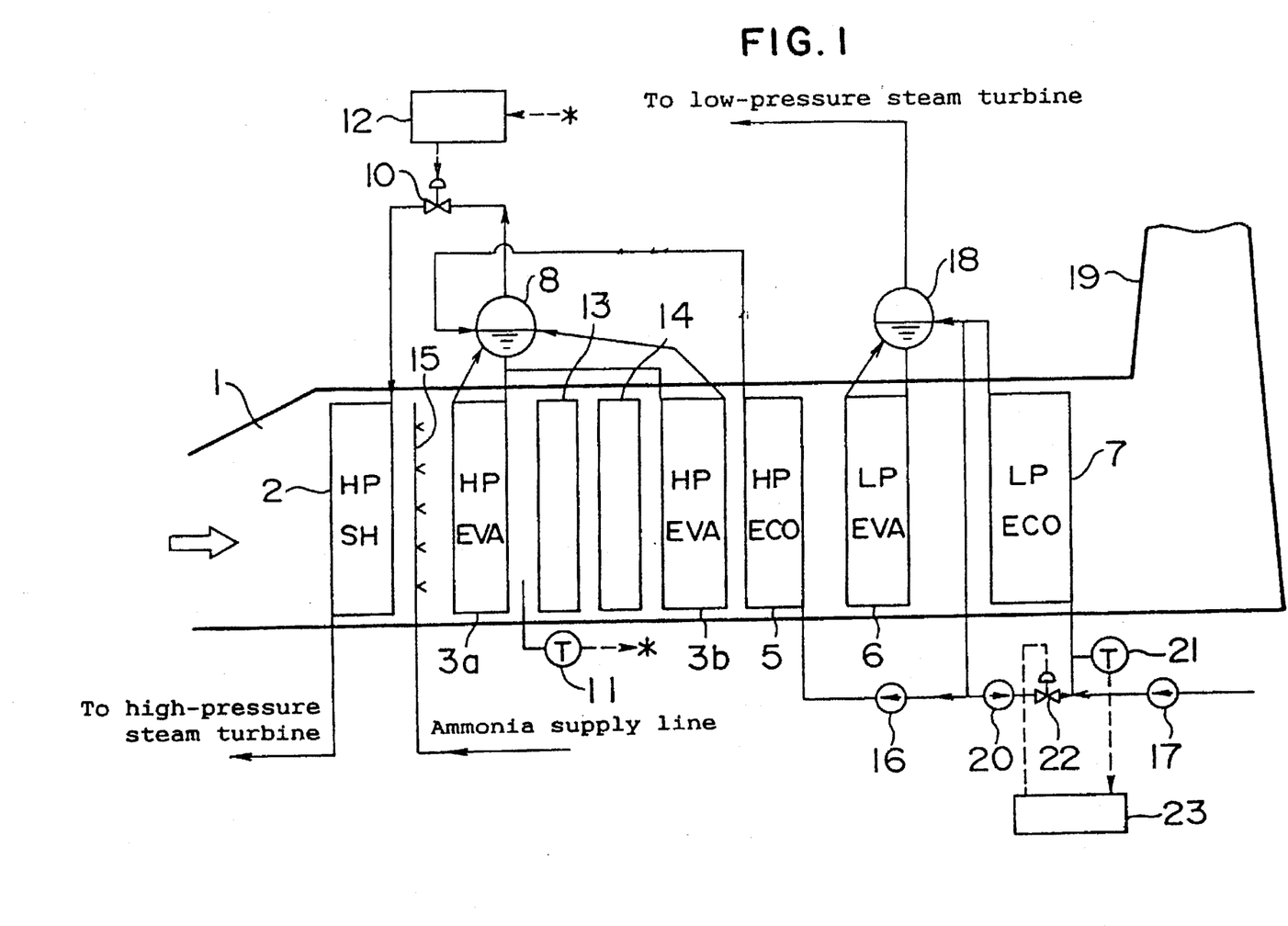
FIG. 1 is a heat transfer surface arrangement diagram illustrating a first embodiment of the present invention.

FIG. 1 is a heat transfer surface arrangement diagram illustrating a first embodiment of the present invention. In this figure, parts similar to those described above in connection with FIGS. 4 and 6 are designated by the same reference numerals and no detailed description thereof is given herein. In this embodiment, the following reference numerals are additionally used: $3a$ and $3b$, divided high-pressure evaporators 10, a steam pressure control valve; 11, a gas temperature sensor; 12, a gas temperature controller; 14, a residual ammonia decomposer; 20, a low-pressure economizer circulating pump; 21, a low-pressure economizer inlet fluid temperature sensor; 22, a low-pressure economizer inlet temperature control valve; and 23, a low-pressure economizer inlet temperature controller.

As to the arrangement of heat transfer surfaces in this embodiment, a high-pressure superheater 2, high-pressure evaporators $3a$ and $3b$, a high-pressure economizer 5, a low-pressure evaporator 6 and a low-pressure economizer 7 are disposed in that order from the upstream to the downstream side. Moreover, a denitrator 13 and a residual ammonia decomposer 14 are disposed between the divided high-pressure evaporators $3a$ and $3b$. Ammonia is injected through an ammonia injection nozzle 15 located on the upstream side of the high-pressure evaporator 3.

In the denitrator 13, the injected ammonia reacts with nitrogen oxide to reduce it. The surplus ammonia, which has not been consumed in the denitrator 13, is decomposed into nitrogen gas and water vapor in the residual ammonia decomposer disposed on the downstream side thereof. Accordingly, even if sulfur oxides are contained in the exhaust gas, there is no possibility that acid ammonium sulfate will be deposited on the surfaces of the low-pressure evaporator 6, low-pressure economizer, 7 and other units which are disposed in the downstream low-temperature gas section. As a result, the exhaust gas boiler can recover waste heat even in the low-temperature gas region, resulting in an improvement in plant efficiency.

If the content of sulfur oxides in the exhaust gas is high, a low-pressure economizer inlet temperature control valve 22 is opened by a low-pressure economizer inlet temperature controller: 23 on the basis of the value measured by a low-pressure economizer inlet fluid temperature sensor 21, in order to prevent the low-temperature corrosion of heating tubes in the low-temperature gas section. At the same time, a low-pressure economizer circulating pump 20 is operated to mix a portion of the effluent water of the low-pressure economizer 7 with the condensate at the inlet of the low-pressure economizer 7. Thus, the surface temperature of the heating tubes can be maintained on a high level.

The residual ammonia decomposer 14 has substantially the same construction as the denitrator 13, but uses an ammonia decomposition catalyst in place of the denitration catalyst. As the ammonia decomposition catalyst, there may be used a Cu-supported metallosilicate catalyst as disclosed, for example, in Japanese Patent Application Nos. 281996/'89, 051371/'91 and 192829/'91. Thus, the residual ammonia is decomposed into nitrogen gas and water vapor according to the following reaction formula.

$$4NH_3+3O_2 \rightarrow 2N_2+6H_2O$$

Figure 7:
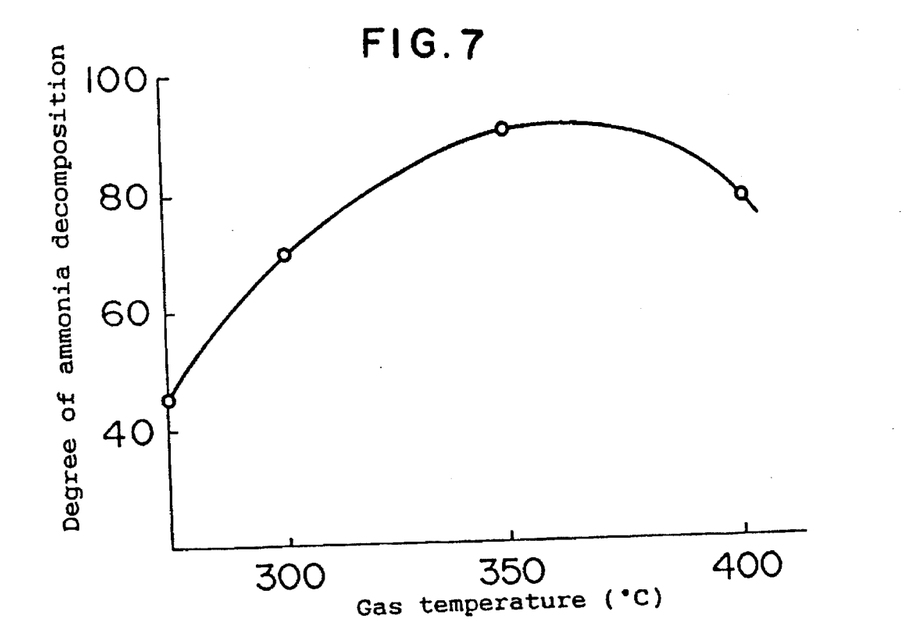
FIG. 7 is a graph showing one example of the performance of an ammonia decomposer.

An ammonia decomposer using such a Cu-supported metallosilicate catalyst has characteristics shown in FIG. 7. In FIG. 7, the $NH_3$ concentration is 30 ppm, the $O_2$ concentration is 14.7%, and the SV value is 20,000 l/H. The gas temperature region in which the activity of the catalyst can be utilized to the fullest extent is from 300° to 400° C. If the gas temperature exceeds 400° C., ammonia is undesirably oxidized to form nitrogen oxide according to the following reaction formula.

$$4NH_3+5O_2 \rightarrow 4NO+6H_2O$$

As is obvious from the above description, it is effective to dispose the residual ammonia decomposer in a gas temperature region of 300° to 400° C. According to the above-described FIG. 5, this region corresponds to an intermediate part of the high-pressure evaporator. In this embodiment, therefore, the divided high-pressure evaporators $3a$ and $3b$ are used so that the residual ammonia decomposer 14 may be located in a temperature region of 300° to 400° C.

Figure 8:
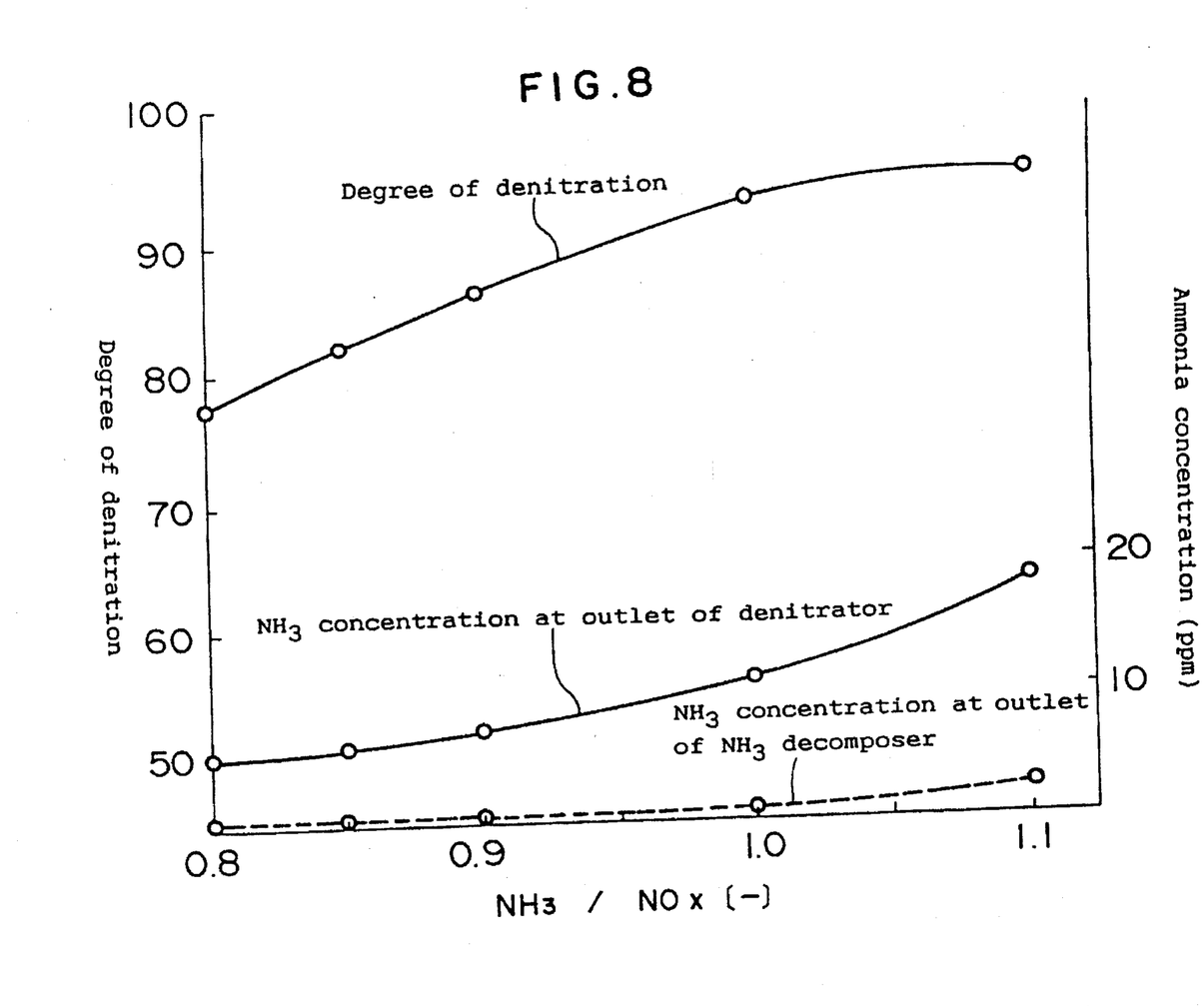
FIG. 8 is a graph showing one example of the performance obtained by the combined use of a denitrator and an ammonia decomposer.

FIG. 8 is a graph showing one example of the performance obtained by the combined use of a denitrator and an ammonia decomposer. In FIG. 8, the $NO_x$ concentration is 100 ppm, the $O_2$ concentration is 14.7%, and the gas temperature is 360° C. In this embodiment, an increase in the amount of ammonia injected causes little increase in surplus ammonia, so that the denitration efficiency can be enhanced by supplying an ample amount of ammonia.

The embodiment of FIG. 1 is suitable for use in cases where the pressure of the high-pressure drum does not vary substantially with the load. In order to keep the gaseous atmosphere temperature of the residual ammonia decomposer as high as possible, during start-up or the like, and utilize it as soon as possible, a pressure control valve 10 is controlled by a gas temperature controller 12 on the basis of the value measured by a gas temperature sensor 11, and the pressure of the high-pressure steam drum 8 is thereby maintained on a high level.

Figure 2:
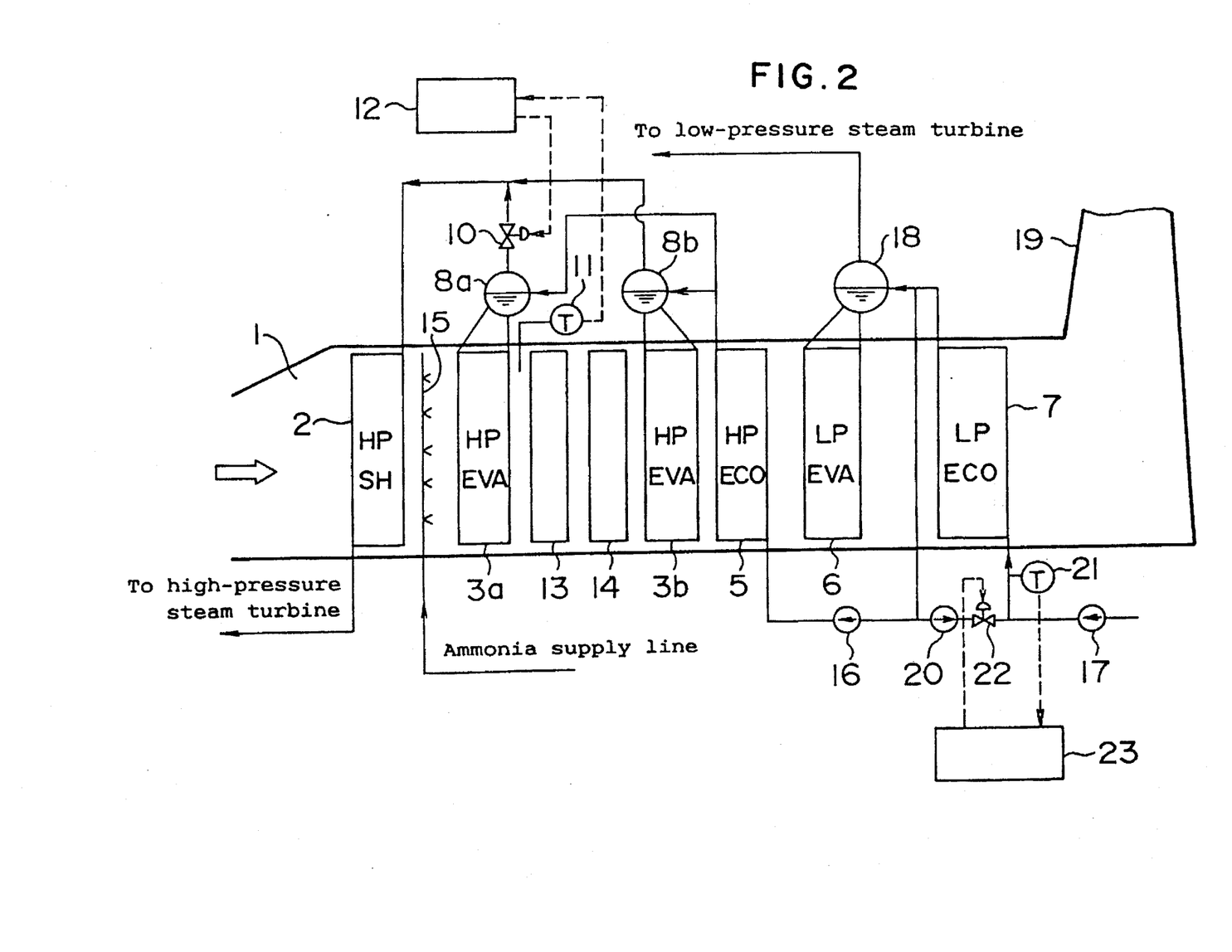
FIG. 2 is a heat transfer surface arrangement diagram illustrating a second embodiment of the present invention.

Next, FIG. 2 is a heat transfer surface arrangement diagram illustrating a second embodiment of the present invention. Also in this figure, parts similar to those described above are designated by the same reference numerals and no detailed description thereof is given herein. In this embodiment, the high-pressure evaporators 3a and 3b are completely isolated and connected separate high-pressure steam drums 8a and 8b, respectively.

Where the steam turbine system is operated under sliding pressure conditions, the steam pressure becomes lower as, the turbine load is reduced. This may being about a situation in which the gas temperature of the ammonia decomposer is also reduced and tends to be lower than 300° C. Even in such a situation, the operation can be continued while the gas temperature in the vicinity of the ammonia decomposer is maintained in the range of 300° to 400° C. by controlling the pressure of the steam system on the upstream side of the ammonia decomposer. In this embodiment, the high-pressure evaporators 3a and 3b are completely isolated and connected to separate high-pressure steam drums 8a and 8b, respectively. The gaseous atmosphere temperature of the residual ammonia decomposer 14 is measured by the gas temperature sensor 11, and the steam pressures of the high-pressure steam drum 8a and the high-pressure evaporator 3a are controlled by the temperature controlled 12 and the pressure control valve 10 so that the measured temperature will be equal to a predetermined temperature at any stage of operation.

Figure 3:
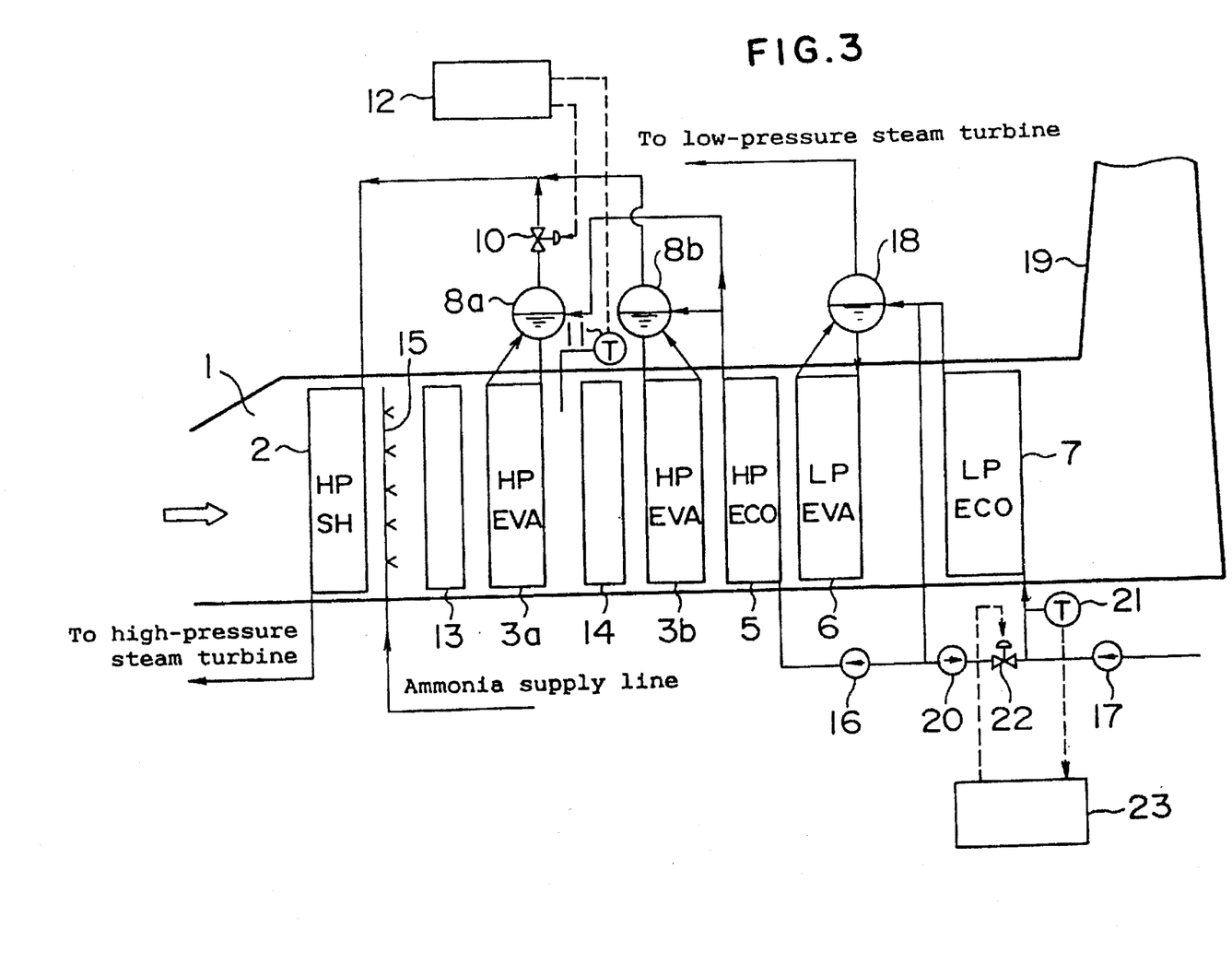
FIG. 3 is a heat transfer surface arrangement diagram illustrating a third embodiment of the present invention.

FIG. 3 is a heat transfer surface arrangement diagram illustrating a third embodiment of the present invention. In this embodiment, the denitrator 13 is disposed on the upstream side of the high-pressure evaporator 3a. Also in this case, the performance (i.e., ammonia absorption characteristics) of the residual ammonia decomposer 14 is comparable to that described above, so that substantially the same action and effects as those of the first and second embodiments can be achieved.

We claim:

1. An exhaust gas boiler comprising a denitrator, a residual ammonia decomposer and two divided high-pressure evaporators, wherein the residual ammonia decomposer is disposed at a location downstream of the denitrator and between the two divided high-pressure evaporators, and means for controlling the internal pressure of one of the two divided, high-pressure evaporators which is disposed on the upstream side of the residual ammonia decomposer.

2. An exhaust gas boiler as claimed in claim 1 which further comprises a high-pressure economizer, a low-pressure evaporator and a low-pressure economizer disposed downstream of the two divided high-pressure evaporators in the sequence of a high pressure economizer, a low-pressure evaporator and a low-pressure economizer.

3. An exhaust gas boiler comprising a denitrator, a residual ammonia decomposer and two divided evaporators which have different stream pressure levels, wherein the residual ammonia decomposer is disposed at a location downstream of the denitrator and between the two divided evaporators, and means for controlling the internal pressure of one of the two divided evaporators which is disposed on the upstream side of the residual ammonia decomposer.

4. An exhaust gas boiler as claimed in claim 3 which further comprises a high-pressure economizer, a low-pressure evaporator and a low-pressure economizer disposed on the downstream of the two divided evaporators in the sequence of a high-pressure economizer, a low-pressure evaporator and a low-pressure economizer.

* * * * *